(12) United States Patent
Teets (10) Patent No.: US 12,060,827 B2
(45) Date of Patent: *Aug. 13, 2024

(54) ADVANCED 2-SPOOL TURBOPROP ENGINE

(71) Applicant: Joseph Michael Teets, Hobe Sound, FL (US)

(72) Inventor: Joseph Michael Teets, Hobe Sound, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,214

(22) Filed: Aug. 18, 2023

(65) Prior Publication Data

US 2023/0392547 A1 Dec. 7, 2023

Related U.S. Application Data

(63) Continuation of application No. 16/873,610, filed on May 22, 2020, now Pat. No. 11,788,464.

(Continued)

(51) Int. Cl.
*F02C 3/10* (2006.01)
*F02C 7/32* (2006.01)
*F02C 7/36* (2006.01)

(52) U.S. Cl.
CPC ............... *F02C 3/103* (2013.01); *F02C 7/32* (2013.01); *F02C 7/36* (2013.01); *F05D 2220/323* (2013.01)

(58) Field of Classification Search
CPC .................... F02C 3/103; F02C 7/36
See application file for complete search history.

(56) References Cited

U.S. PATENT DOCUMENTS

| | | | | | |
|---|---|---|---|---|---|
| 2,336,010 | A | * | 12/1943 | Gregory | F02B 33/00 |
| | | | | | 415/149.3 |
| 3,307,587 | A | * | 3/1967 | Rylatt | F04D 29/441 |
| | | | | | 415/212.1 |

(Continued)

*Primary Examiner* — Lorne E Meade
(74) *Attorney, Agent, or Firm* — Lambert Shortell & Connaughton; David J. Connaughton, Jr.; Justin P. Tinger (57) ABSTRACT

A low cost, high power density, low emissions general aviation turbine engine (GATE) with improved fuel economy over current engines. Ideally suited for 50 to 500 shaft horsepower (SHP) range aircraft applications such as GA, UAS, UAS, air taxi, helicopters and commercial markets. The engine design features with centrifugal compressor and radial turbine rotors has a high-end practical limit of ~800 (SHP). The new turboprop incorporates 2 non-concentric spools aero-thermal-pressure coupled wherein staged compressor rotors lend to a simple engine design, optimized high overall engine pressure ratio (OPR) and low specific fuel consumption (SFC). An integral starter—generator system further simplifies the engine design and offers high electrical output power capability for auxiliary power requirements. A 2-stage low emissions combustor with fuel-air premix chambers is incorporated lending to stable combustion at any engine spool speed/power requirement, further fuel optimization and use of a low cost simple fixed pitch propeller. Some other highlights include: any fuel or mixture thereof, TBO greater than piston or other turbine engines, less maintenance costs, oil/filter change at ~15000 hrs. and other inherent advantages of a gas turbine engine. Of the two spools that make up this turboprop engine, one is the High Pressure (HP) spool that is part of the gas generator using combustor hot gases to power the integral HP turbine rotor, HP compressor and high-speed alternator starter—generator. The other engine spool is the Low-Pressure (LP) spool that receives the HP turbine exhaust heat energy to power the integral LP compressor rotor, LP turbine rotor, integrated gearbox with resultant output shaft horsepower.

(Continued)

This invention represents the most advanced engine for general aviation since Charles Edward Taylor's engine powered the Wright Brothers first aircraft-controlled powered flight Dec. 17, 1903.

19 Claims, 7 Drawing Sheets

Related U.S. Application Data

(60) Provisional application No. 62/921,077, filed on May 30, 2019.

(56) References Cited

U.S. PATENT DOCUMENTS

| | | | |
|---|---|---|---|
| 4,569,199 A * | 2/1986 | Klees | F02K 3/075 60/773 |
| 4,827,712 A * | 5/1989 | Coplin | F02K 3/06 60/751 |
| 4,845,944 A * | 7/1989 | Rodgers | F02C 3/13 60/787 |
| 6,137,199 A * | 10/2000 | Lindsley | H02K 7/1815 310/74 |
| 6,182,449 B1 * | 2/2001 | Halimi | F02B 37/14 123/65 VC |
| 6,735,954 B2 * | 5/2004 | MacFarlane | F02K 3/068 60/793 |
| 8,789,365 B2 * | 7/2014 | Maier | F03B 13/24 415/199.2 |
| 9,297,305 B2 * | 3/2016 | Drachsler | F02C 3/05 |
| 11,047,312 B2 * | 6/2021 | Klonowski | F02C 6/206 |
| 11,788,464 B2 * | 10/2023 | Teets | F02C 3/103 60/39.01 |
| 2009/0211260 A1 * | 8/2009 | Kesseli | F02C 7/275 60/786 |
| 2013/0074516 A1 * | 3/2013 | Heward | F02C 7/36 60/786 |
| 2022/0136401 A1 * | 5/2022 | Kupratis | F02K 3/06 60/719 |

\* cited by examiner

ADVANCED 2-SPOOL TURBOPROP ENGINE

BACKGROUND OF THE INVENTION

Field of the Invention

The present invention relates generally to turboprop engine and more specifically, it relates to an Advanced 2-spool turboprop engine for an advanced 2 spool high efficiency microturbine/turboprop having an output power gearbox integrated LP Spool Housing and separate HP Spool Housing that are interconnected thru compressor and turbine fluid transfer tubes/ducts aero-Thermal-pressure-coupled and a HP Spool Module having an integral permanent magnet (PM) alternator (starter/generator capability) removing the need of an additional gearbox wherein the HP Spool Housing (gas generator) has the ability to function as APU, also improved engine output power efficiency thru higher engine operational pressure ratio (OPR), variable engine speed operations at off design conditions without variable geometry combustor or engine inlet guide vanes (IGV), offers low emissions combustor operation at design/off design engine operation, engine lower purchase cost thru reduced engine components/architecture engine modular housings, greater reliability lending new engine markets in general aviation industry [general aviation turbine engine (GATE)] and expanded use in UAV and UAS applications.

Description of the Prior Art

It can be appreciated that turboprop engines have been in use for years. Typically, turboprop engines are comprised of aircraft turboprop engines, turboshaft, auxiliary power units (APU), ground vehicle, UAV, UAS and distributed energy electrical power generation markets. The first turboprop engine was invented by Gyorgy Jendrassi in 1929. Sir Francis Whittle invented the first turbojet with radial (centrifugal) compressor and Hans von Ohain invented the first axial flow compressor turbojet. Both individuals thru government and or private industry funded their first prototypes and successfully ran in 1937 and the latter engine was the first successful jet engine power aircraft He178 flown in 1939. The Japanese during WWII using German Hans von Ohain designs began construction of the German derivative. In 1945 the British Gloster Meteor fighter was fitted with two Rolls-Royce RB.5 "Trent" turboprop engines a derivative of Whittle's engine. In 1942 Allison ran their first turbojet engine J33 using a Whittle type radial compressor. In 1945 using a GE T-31 (TG100) turboprop engine was fitted to a Vultee XP-81 and became the first American turboprop aircraft flown. Pratt and Whitney Aircraft began turbojet design thru license right with Rolls Royce in 1947 using Whittle's radial compressor design. This new invention, Advanced 2-Spool turboprop engine, although could be applied to larger engine sizes and other markets, the focus is on the uniqueness of this 2-spool gas turbine engine 50 to 500 SHP turboprop/turboshaft applications with engine features of: radial compressor and turbine rotors, low cost thru design simplicity, high life, reduced weight, compactness, reduced maintenance, improved fuel efficiency, variable engine spool operational speed capability and low emissions combustion without compromise. The turboprop engine for fixed wing use is preferred over the turbofan under 400 mph application because of lower fuel use. The current turboprop engines have inherent advantages over the piston engine but with limited use in general aviation, UAV and UAS markets because of higher initial purchase price and higher fuel use than that of the piston engine types. The Advanced 2-Spool turboprop engine configuration with new design offers lower initial purchase, incorporates new technologies, simplicity, higher TBO and higher OPR the latter offering lower fuel use lending to replacement of current aircraft piston engine (gasoline or diesel types) and future production general aviation, commercial and UAV/UAS markets.

Current turboprop/turboshaft engine of major manufacturers have an initial purchase price for the aircraft use, range from ~$350,000 (~500 SHP) to ~$800,000 (2000 SHP) with an average TBO @~4000 hrs. General aviation piston engine new 100 to 350 SHP price range ~$50,000 to $110,000 with TBO at ~2,000 hrs. the latter overhaul remanufacture cost to the customer is ~½ the cost of new engine. The Advanced 2-Spool engine design (50 SHP to 500 SHP) as an example 250 SHP engine manufacturing estimated cost [engine-gearbox–full authority digital engine control (FADEC) is ~$125,000, weight 170 lbs., TBO 7000 hrs. with estimated engine life @ 20,000 hrs and cost of $75,000 total for all TBO's. Other calculations of the advanced 2 spool turboprop engine (@ SLSTO) SHP/SFC (lbs./hr.-SHP)/weight/$ mfr. cost/output electric power capability include: 1/50 shp/0.51 SFC/80 lbs/$60000/4 kW, 2/200 SHP/0.45 SFC/145 lbs./$120,000/12 kW, 3/350 shp/ 0.43 SFC/195 lbs./$160,000/21 kW, 4/500 SHP/0.39 SFC/ 250 lbs/$175,000/27 kW are examples of preliminary calculations.

Some of the current turboprop production aircraft of major engine manufacturers 500-2000 SHP range include: Honeywell TPE331 engine series (single spool OPR 8:1 to 10.5:1, 0.57 to 0.54 SFC, 575 SHP to 940 SHP, $400,000 to $600,000), Pratt and Whitney Aircraft PT6 series engines (single spool with 1 free turbine (500 SHP to 1900 SHP, 0.7 to 0.43 SFC, 6:1 to 14:1 OPR) $500,000 to $900,000, PW200 series engine (single spool, one free turbine) 560 SHP, 8.5:1 OPR, 0.541 SFC), PW100 series engines (2 spools, one free turbine, 1500 SHP to 5000 SHP, 14:1 to 18:1 OPR, SFC 0.43 to 0.49, Rolls-Royce—Allison 250 series one spool and one free turbine, 250 SHP to 700 SHP, 6:1 to 9:1 OPR, 0.77 SFC to 0.62 SFC, $270,000 to $400,000 and GE/Walters M601 base engine, H80, 7:1 OPR, 700 SHP to 900 SHP, Catalyst series, 850 SHP to 1600 SHP range, one spool, one free turbine, 16:1 OPR, SFC estimated at 0.48, variable inlet guide vanes for off design operation most likely toward combustion stability. Other company attempts for a new turboprop into GA include, Cyclone Co. in 1980-1985, JT500 engine design, 500 SHP 10:1 OPR, 0.54 SFC with one spool and Noel Penny in the early 1980's with a Continental Motors JV developed a few prototype turboprop engines for a small twin-engine general aviation aircraft, the engine OPR was ~8:1 single spool but had high fuel use, gearbox/gear teeth failure issues and subsequently did not go into production.

Figure 7:
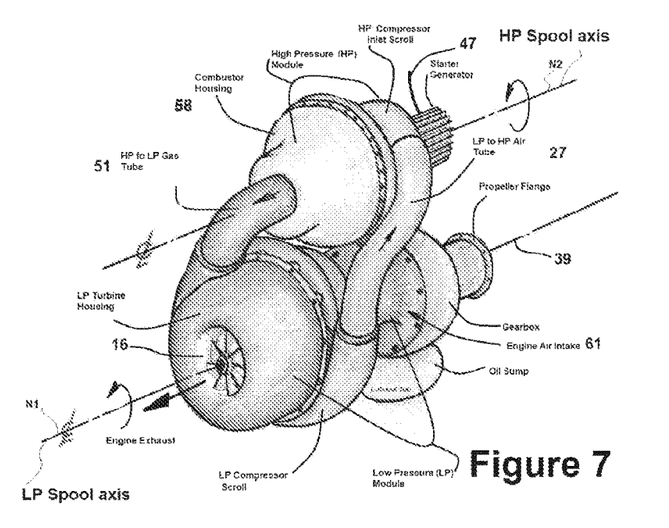
FIG. 7 is 3D art rendering, Advanced 2-Spool Turboprop engine, HP Spool and LP Spool, vertical engine architecture.

The main problem with conventional turboprop engines typical of current turboprop/turboshaft technology designs, developed 1960's thru 1990's have a single spool gas generator with an integrated gearbox, a free turbine with another gearbox to drive a propeller/output shaft and engine overall pressure ratio (OPR) range from 6:1 (0.8 SFC) to 10:1 (0.54 SFC), needs to have the engine OPR higher for optimum improved fuel efficiency. Recently more advanced engines the PW100 series @~16:1 OPR has 2 spools as a gas generator with gearbox and a free turbine with additional gearbox to drive a propeller/output power shaft; and GE 601 series having a single spool gas generator with accessory gearbox and a free turbine with an additional gearbox that drives a propeller, 17:1 OPR and both engine series output power SHP>800 SHP both engines although further reduced SFC but are high in purchase cost and complexity. Also, the noted GE engine has variable geometry inlet guide vanes like the AGT101 vehicular gas turbine engine (Garrett—Ford JV with DOE) necessary for off design operation stable combustor operation. Although suitable for the current applications and less fuel consumption as compared to earlier gas turbine engine operations is not practical for smaller power range 50 to 500 SHP would be cost prohibitive to enter in the GA business market. The new Advanced 2-Spool turboprop, pending engine output power requirements, has non-cooled turbine engine components for cost considerations and reduced engine cost to manufacture, the optimized engine overall pressure ratio (OPR) for best engine efficiency per cycle analysis is 14:1 (50 SHP engine) to 18:1 (500 SHP engine size) considering turbine inlet temperature of 1875° F. and pending engine airflow. Reference FIG. 7. The new Advanced 2-Spool turboprop makes use of radial turbine and compressor rotors thus, less part count and less engine cost along with further improved fuel efficiency thru better component efficiency over the axial type turbine and improved disk durability not having disk bores.

Another problem with conventional turboprop engine is although the current engine designs and architecture offers good earlier technology single spool with free power turbine or 2-spool with free turbine they are complex lending to higher purchase cost wherein the Advanced 2-spool turboprop engine uses only one gearbox has a 2-spool staged compressor higher OPR, lower engine fuel use and less cost thru less part count. The Advanced 2-Spool turboprop engine has two separate modular spool housings/nonconcentric spools with an integrated alternator rotor (starter generator) to the gas generator HP spool removing the need of an accessory gearbox further simplicity, reduced engine purchase cost, less maintenance ideal for use in new market penetration of general aviation, UAV and UAS. Furthermore, the improved fuel efficiency is better than the current piston engines (diesel and gasoline).

Another problem with conventional turboprop engine are the current turboprop and turboshaft engines are typically a single spool design/architecture with inherent constant engine design speed operation requires variable geometry (variable area engine air flow change about the combustor or staged fuel nozzle operation or variable inlet engine airflow) for combustor off design engine/combustion operation and necessitates variable pitch prop use whereas the Advanced 2-Spool turboprop engine design does not require variable geometry lending to lower engine initial purchase cost and the engine can operate at any rotor speed off design requirements.

While the current turboprops may be suitable for the particular purpose to which they address, they are not as suitable for an Advanced 2-Spool turboprop high efficiency microturbine/turboprop having an output power gearbox integrated LP Spool Housing and separate HP Spool Housing that are interconnected thru compressor and turbine fluid transfer tubes/ducts aero-thermal pressure coupled and a HP Spool Module having an integral permanent magnet (PM) alternator (starter/generator capability) removing the need of an additional gearbox wherein the HP Spool Housing (gas generator) has the ability to function as APU, also improved engine output power efficiency thru higher engine operational pressure ratio (OPR), variable engine speed operations at off design conditions without variable geometry combustor or engine inlet guide vanes (IGV), offers low emissions combustor operation at design/off design engine operation, engine lower purchase cost thru reduced engine components/architecture engine modular housings, greater reliability lending new engine markets in general aviation industry [general aviation turbine engine (GATE)] and expanded use in UAV and UAS applications.

In these respects, the Advanced 2-Spool turboprop engine according to the present invention substantially departs from the conventional concepts and designs of the prior art, and in so doing provides an apparatus primarily developed for the purpose of an Advanced 2-Spool high efficiency microturbine/turboprop having an output power gearbox integrated LP Spool Housing and separate HP Spool Housing that are interconnected thru compressor and turbine fluid transfer tubes/ducts aero-thermal-pressure coupled and a HP Spool Module having an integral permanent magnet (PM) alternator (starter/generator capability) removing the need of an additional gearbox wherein the HP Spool Housing (gas generator) can function as APU, also improved engine output power efficiency thru higher engine operational pressure ratio (OPR), variable engine speed operations at off design conditions without variable geometry combustor or engine inlet guide vanes (IGV), offers low emissions combustor operation at design/off design engine operation, engine lower purchase cost thru reduced engine components/architecture engine modular housings, greater reliability lending new engine markets in general aviation industry [general aviation turbine engine (GATE)] and expanded use in UAV and UAS applications.

SUMMARY OF THE INVENTION

In view of the foregoing disadvantages inherent in the known types of turboprop engines now present in the prior art, the present invention provides a new Advanced 2-Spool turboprop engine construction wherein the same can be utilized for an Advanced 2-Spool high efficiency microturbine/turboprop having an output power gearbox 21 integrated LP Spool Housing 30 and separate HP Spool Housing 40 that are interconnected thru compressor and turbine fluid transfer tubes/ducts aero-thermal-pressure coupled and a HP Spool Module having an integral permanent magnet (PM) alternator (starter/generator capability) removing the need of an additional gearbox wherein the HP Spool Housing (gas generator) has the ability to function as APU, also improved engine output power efficiency thru higher engine operational pressure ratio (OPR), variable engine speed operations at off design conditions without variable geometry combustor or engine inlet guide vanes (IGV), offers low emissions combustor operation at design/off design engine operation, engine lower purchase cost thru reduced engine components/architecture engine modular housings, greater reliability lending new engine markets in general aviation industry [general aviation turbine engine (GATE)] and expanded use in UAV and UAS applications.

The general purpose of the present invention, which will be described subsequently in greater detail, is to provide a new Advanced 2-Spool turboprop engine that has many of the advantages of the turboprop engine mentioned heretofore and many novel features that result in a new Advanced 2-Spool turboprop engine, which is not anticipated, rendered obvious, suggested, or even implied by any of the prior art turboprop engine, either alone or in any combination thereof.

Figure 1:
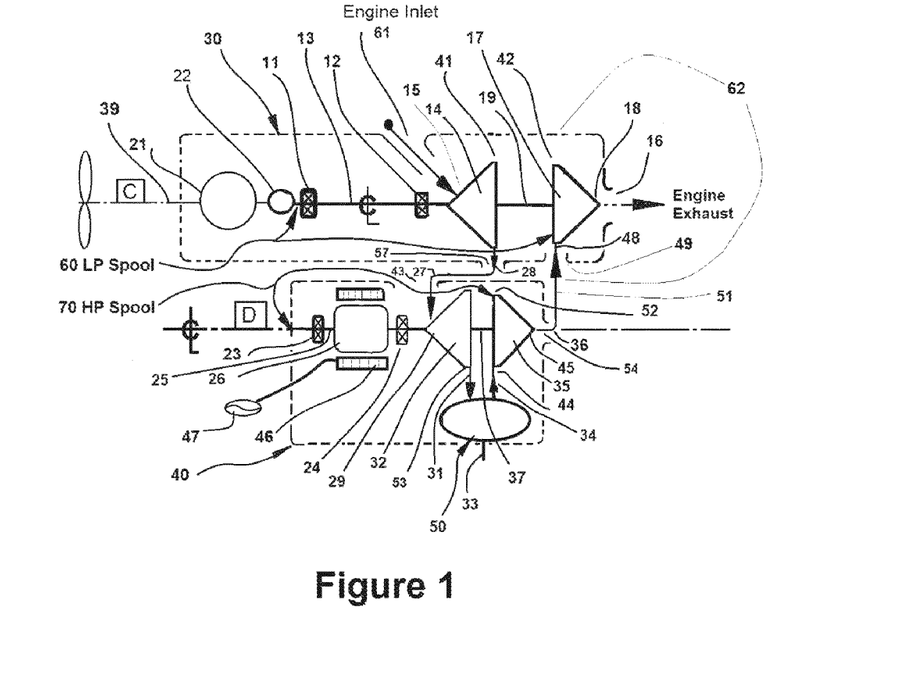
FIG. 1, schematic Advanced 2-Spool Turboprop engine, LP Spool-output power, HP Spool-Gas Generator-integral alternator, 2 parallel spools.

To attain this, the present invention generally comprises the preferred embodiment FIG. 1 has a Low Pressure (LP) Spool Housing 30 with an integrated output power gear box 21 assembly, retains a LP Spool 60, a LP Turbine Housing

30 in close proximity, parallel non-concentric to a High Pressure (HP) Spool Housing 40 (gas generator) wherein retained in the HP Housing are: HP Spool 70, an alternator stator 46, a combustor with fuel supply means, a combustor cover with communication to HP turbine exhaust gas transfer tube, a LP Compressor discharge air to HP Compressor inlet air transfer tube and the HP Turbine exhaust gas to LP Turbine Housing gas inlet transfer tube. Other engine components not shown in the figures for simplicity include: radial seal plate positioned between the radial compressor and radial turbine rotors of the spool modules with inner diameter in close proximity to the integral common shaft between the rotors, a LP compressor stage diffuser interconnected to LP compressor discharge air scroll having an integral LP compressor blade tip shroud and a HP compressor inlet scroll with integral rotor \ blade shroud, HP and LP turbine nozzles with integral blade tip shrouds. The LP Spool 60 has a LP radial (centrifugal) compressor rotor 14, a LP radial turbine rotor 17, a LP compressor rotor shaft 13 with (distal) bearing 11 and aft (proximal) bearing 12 the latter adjacent to the LP compressor rotor 14 inlet End 15 and a output power drive means 22 to the gearbox 21. The LP Spool Housing 30 retains: the LP Spool 60, a gearbox 21 with oil sump, a LP compressor air inlet duct 61, a LP compressor diffuser 28, a LP compressor scroll (between LP diffuser exit and air transfer tube 27 exit), a LP Turbine housing 62, a LP turbine nozzle with shroud having an LP turbine nozzle exhaust port 16.

The HP Spool 70 has a HP radial compressor rotor 32, a HP radial turbine rotor 35, a HP compressor rotor shaft with bearings (proximal end bearing 23 and distal bearing 24 adjacent to HP compressor inlet end) and an integral alternator rotor 26 with alternator stator 46. The LP Turbine Housing 62 has preferably a gas inlet scroll form receives HP turbine exhaust gas at entrance port 49, has a LP turbine nozzle exhaust gas port 16, retains the turbine nozzle with integral HP turbine blade shroud and is attached to the LP turbine Housing 62. The HP Spool Housing retains: the HP Spool 70, a HP compressor inlet scroll with compressor blade tip shroud, HP compressor diffuser, a combustor, a HP turbine nozzle with blade tip shroud and HP Turbine Nozzle Exhaust Port 54 and an alternator stator 46 with power leads 47 located about the alternator rotor. The Combustor receives HP compressor discharge air, has external fuel supply 33, creates a combustible fuel therein and supplies heat energy to the HP turbine rotor/stage. The combustor cover retains and seals the combustor to the HP Spool Housing has communication with the HP compressor supply air, HP turbine nozzle seal means, HP turbine nozzle exhaust gas and HP to LP gas transfer tube 36. The LP to HP Air Tube 27 is the transfer means of LP compressor discharge air exiting LP compressor diffuser 28 to the HP compressor inlet. The HP to LP Gas Tube is the transfer means of HP turbine exhaust gas to the LP turbine housing inlet port.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an Advanced 2-Spool turboprop engine that will overcome the shortcomings of the prior art devices.

An object of the present invention is to provide an advanced 2-spool turboprop engine for an Advanced 2-Spool high efficiency microturbine/turboprop having an output power gearbox integrated LP Spool Housing and separate HP Spool Housing that are interconnected thru compressor and turbine fluid transfer tubes/ducts aero-thermal-pressure coupled and a HP Spool having an integral permanent magnet (PM) alternator (starter/generator capability) removing the need of an additional gearbox wherein the HP Spool Housing (gas generator) has the ability to function as APU, also improved engine output power efficiency thru higher engine operational pressure ratio (OPR), variable engine speed operations at off design conditions without variable geometry combustor or engine inlet guide vanes (IGV), offers low emissions combustor operation at design/off design engine operation, engine lower purchase cost thru reduced engine components/architecture engine modular housings, greater reliability lending new engine markets in general aviation industry [general aviation turbine engine (GATE)] and expanded use in UAV and UAS applications.

Another object is to provide an Advanced 2-Spool turboprop engine that thru a 2-spool gas turbine engine having one gearbox and 2 staged rotor compressors for high optimized engine overall pressure ratio (OPR) improves engine output power efficiency removing the need for a exhaust gas heat exchanger.

Another object is to provide an Advanced 2-Spool turboprop engine that offers simplicity thru modular engine housings, reduced engine component complexity/part count/integral radial bladed rotors in a 2-Spool turboprop engine design/architecture offers reduced engine purchase price allows expanding use in general aviation (fixed wing and helicopters), UAV and UAS markets.

Another object is to provide an Advanced 2-Spool turboprop engine that a 2 spool architecture allows off design engine operation LP Spool and HP Spool the ability to operate at reduced spool speeds for further reduced fuel use and allow fixed pitch propeller without need of variable pitch prop thru low-speed LP spool capability at off design conditions.

Another object is to provide an Advanced 2-Spool turboprop engine that a 2 spool engine design, allows for ease of gas generator starting without the need of a gearbox, thru a HP spool (PM) alternator integration as a starter/generator requires less starting electric power leaving only one gearbox for LP Spool reduced output shaft rpm requirements, offers additional less fuel use at off design engine operation.

Another object is to provide an Advanced 2-Spool turboprop engine that with the integration of the (PM) alternator into the HP and considering variable engine speed capability of both spools, the engine as a prime mover can double in use as an integral APU at design and off design electrical power requirements.

Another object is to provide an Advanced 2-Spool turboprop engine that a 2-spool engine design that allows for engine operation at off design spool speeds without related combustor variable geometry or engine inlet guide vanes for combustor stability, low emissions without compromise and further architecture simplicity offers lower manufacturing cost.

Another object is to provide an Advanced 2-Spool turboprop engine that as a 2-spool gas turbine engine with independent 1st and 2nd spool housing architecture having nonconcentric rotors without rotor bores offers increased disk cyclic life and ability to relative position the 2-spools for optimized engine architecture compactness per application—horizontal (FIG. 3) or vertical (FIG. 7) spool arrangements offer reduced engine cost thru modular manufacture.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3, 3D Art Rendering of FIG. 1, 2 Parallel Spools, horizontal engine architecture.

DESCRIPTION OF THE PREFERRED EMBODIMENT

Turning now descriptively to the drawings, in which similar reference characters denote similar elements throughout the several views, the attached figures illustrate an Advanced 2-spool turboprop engine, which comprises the preferred embodiment FIG. 1 has a Low Pressure (LP) Spool Housing with an integrated output power gear box assembly, retains a LP Spool, a LP Turbine Housing in close proximity, parallel non-concentric to a High Pressure (HP) Spool Housing (gas generator) wherein retained in the HP Housing are: HP Spool, an alternator stator a combustor with fuel supply means, a combustor cover with communication to HP turbine exhaust gas transfer tube, a LP Compressor discharge air to HP Compressor inlet air transfer tube and the HP Turbine exhaust gas to LP Turbine Housing gas inlet transfer tube. Other engine components not shown in the figures for simplicity include: radial seal plate positioned between the radial compressor and radial turbine rotors of the spool modules with inner diameter in close proximity to the common shaft between the rotors, a LP compressor stage diffuser interconnected to LP compressor discharge air scroll having an integral LP compressor blade tip shroud and a HP compressor inlet scroll with integral rotor blade shroud, HP and LP turbine nozzles with integral blade tip shrouds. The LP Spool has a drive means to the gearbox. The LP Spool Housing 30 retains: the LP Spool 60, a gearbox 21 with oil sump, a LP compressor air inlet duct 61, a LP compressor sump, a LP compressor diffuser, a LP compressor air scroll, a LP Turbine housing 62, a LP turbine nozzle with shroud having an LP turbine nozzle exhaust port 16. The HP Spool has a HP radial compressor rotor, a HP radial turbine rotor, a shaft with bearings and integral alternator rotor with alternator stator. The LP Turbine Housing has preferably a gas inlet scroll form receives HP turbine exhaust gas, has a LP turbine nozzle exhaust gas port, retains the turbine nozzle with integral HP turbine blade shroud and is attached to the LP Spool Housing. The HP Spool Housing retains: the HP Spool, a HP compressor inlet scroll with compressor blade tip shroud. HP compressor diffuser, a combustor, a HP turbine nozzle with blade tip shroud and HP turbine nozzle exhaust port and a alternator stator with power leads located about the HP alternator rotor. The combustor receives HP compressor discharge air, has external fuel supply, creates a combustible fuel therein and supplies heat energy to the HP turbine rotor/stage. The combustor cover retains and seals the combustor to the HP Spool Housing has communication with the HP compressor supply air, HP turbine nozzle seal means, HP turbine nozzle exhaust gas and HP to LP gas tube. The LP to HP Air Tube is the transfer means of LP compressor discharge air to the HP compressor inlet. The HP to LP Gas Tube is the transfer means of HP turbine exhaust gas to the LP turbine housing inlet port.

The LP Spool 60 has a LP radial compressor rotor 14, a LP radial turbine Rotor 17, a LP compressor shaft 13 with bearings, proximal bearing 11, distal bearing 12 the latter adjacent to the LP radial compressor inlet and an output drive means 22 to the gearbox 21. The preferred LP Spool embodiment FIG. 1 consists of a LP radial compressor rotor 14, LP radial turbine rotor 17 close coupled with an integral LP compressor shaft 13 extending from air inlet 15 end of the compressor rotor 14, having bearings distal end bearing 12 in close proximity of LP compressor air inlet end and proximal shaft end bearing 11, output power coupling 22 end positioned such to form a cantilevered (overhung) spool system. The rotors have typical unique materials properties for optimized rotor and integral blade life design, cost considerations and lifetime one balance unique to a welded rotor assembly experience in TMA Power, LLC TMA70 (70 kW), 2-spool developed advanced microturbine engine/advanced microturbine engine and also previous microturbine engine designs/business (Elliott Energy Systems, JV between UTES and Elliott). J. Michael Teets and Jon William Teets were the inventors, engineers, designers of the world's first microturbine engine started in October 1993; also, the inventors, designers, engineers of the hybrid gas turbine engine TMA70 (70 kW) world's first advanced 2-spool microturbine having stage aero pressure thermal coupled compressor and turbine rotors for increased engine operation pressure removing the need of a recuperator.

Figure 6:
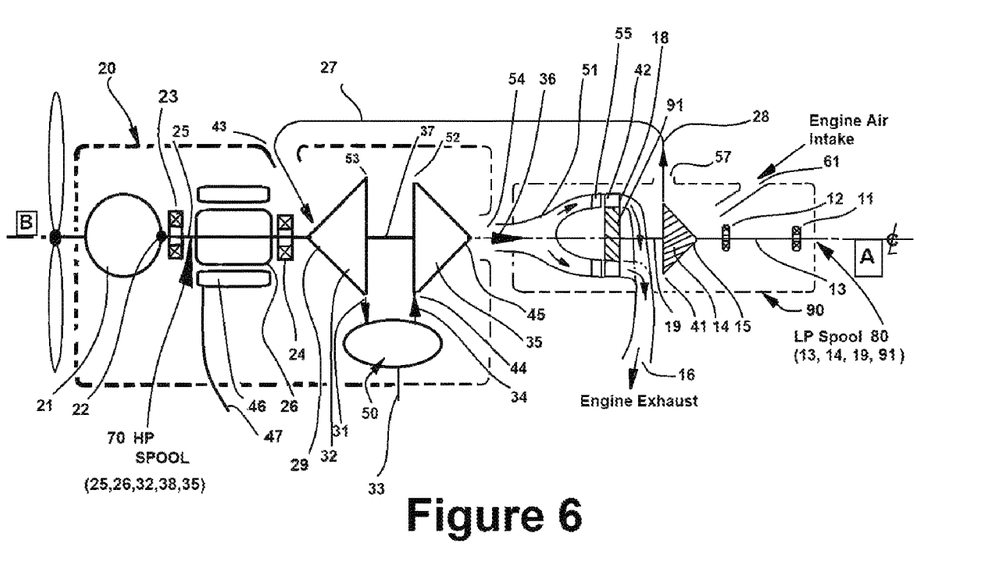
FIG. 6, schematic Advanced 2-Spool turboprop engine, HP Spool output power, gas generator, LP Spool-turbo, spools parallel and concentric.

The advanced 2-spool turboprop engine output power end of the LP Spool shaft has an internal drive spline engagement with an output power drive floating quill drive shaft to drive a gear system of the gearbox for required output power such as turboprop, turboshaft, vehicular drive or electrical power generation synchronous generator applications. The LP Spool with rotor shaft bearings along with compressor diffuser having an integral rotor blade shroud, seal plate positioned between the compressor rotor LP and turbine rotor LP and turbine rotor interfacing with the diffuser and turbine nozzle having integral blade tip shrouds are retained in the LP Spool Housing 30. The compressor rotors and turbine rotors could be axial type (although less efficient, less pressure ratio per stage capable than a radial types), the spool design could be straddled mounted bearing arrangement and the rotors could be non-welded typical in industry interference fitted components or with radial face splines (curvic coupling like reduced disk cyclic life and reduced bearing life. Air bearings, pressurized gas bearing and magnetic bearing could be applied but with added cost and complexity. The air bearings are not suited for vehicular g-load applications. An alternator rotor-system could be incorporated between bearings 11 and 12. for additional electric output power capability and or could also remove gearbox for non-synchronous electric power electrical power generation thru the added alternator system. The compressor rotor and turbine rotor pending size could be a one-piece casting as mono rotor for cost considerations. The HP Spool Housing of FIG. 1 shows parallel to LP Spool Housing 30 could also be up to 180° orientation relative position to best suit application. The gearbox output centerline output shaft shows co-axial to the LP Spool 60 could be off set to allow pending gearbox application and or gear internal arrangements. Also, the engine LP Spool and HP spools in the same horizontal plane could be arranged as vertical pending application. The LP Spool to HP Spool arrangement can be co-axial as shown in FIG. 6 allowing for a smaller engine diameter or width, but the axial length of the engine would be longer. In this configuration the gas generator HP Spool 70 would have an idle speed of ~50% that may necessitate a variable pitch propeller to allow less starting electrical SHP. Also, the integral starter generator PM alternator could be replaced by conventional electric starter motor integrating it thru a gearbox gear arrangement. Reference FIG. 1 this 2-spool configuration could be replaced by a 3-spool system allowing a free turbine to drive the gearbox arrangement wherein the LP spool exhaust gas out of port 16 would drive a radial or axial turbine of the 3rd spool. This scheme would add cost and engine complexity and not gain any further engine output power efficiency. Yet another 2-spool configuration derivative of FIG. 4 and toward the electrical power generation or hybrid electrical vehicular markets (air-land-sea) by removing the gearbox 21 and drive means 22 and increasing the alternator rotor output power. Unlike the fixed 90° relative positioning of the LP and HP spool housing of the hybrid microturbine U.S. Pat. No. 7,574,867 the spool housing relative positioning can be to 180° for package size optimized configuration manufacturing cost incorporating the air and gas transfer tubes 27 and 51, respectively.

The LP Spool Housing retains: the LP Spool 60, a gearbox 21 with oil sump, a LP compressor air inlet duct 61, a LP compressor diffuser, a LP compressor air scroll, a LP Turbine housing 62, a LP turbine nozzle with shroud having an LP turbine nozzle exhaust port 16. The preferred embodiment FIG. 1 the LP Spool Housing 30 and HP Spool Housing 40 are modular having interconnecting gas transfer tubes inclusive of a compressor air and turbine exhaust gas fluid transfer tubes wherein LP compressor discharge air 57 port (exit air of LP compressor Scroll) to HP compressor inlet air 43 port (of HP Compressor inlet air scroll) employs a transfer tube 27 and the HP turbine exhaust gas port 54 to LP Turbine Inlet housing port 49 makes use of a gas transfer tube 51. Ideally the LP compressor has a scroll form for compressor discharge air interconnected to the LP diffuser air exit 28 and at the end of the scroll is an exit port 57 with a seal means to the transfer air 27. The independent modular housings relative LP Spool 60/LP Spool compressor housing 30 are non-concentric to HP Spool 70/HP Spool housing 40 centerlines with relative positioning FIG. 2 up to optimization up to 180° pending application and allow ease of engine modular housing manufacturing. Radial compressor rotors like the radial turbine rotors allow for single unit high load capability and high efficiency relative to axial types, wherein the compressors can handle up to 8.5:1 compressor ratio with good stall margin and efficiency and the turbine up to 7.5:1 pressure ratio with good efficiency.

Figure 3:
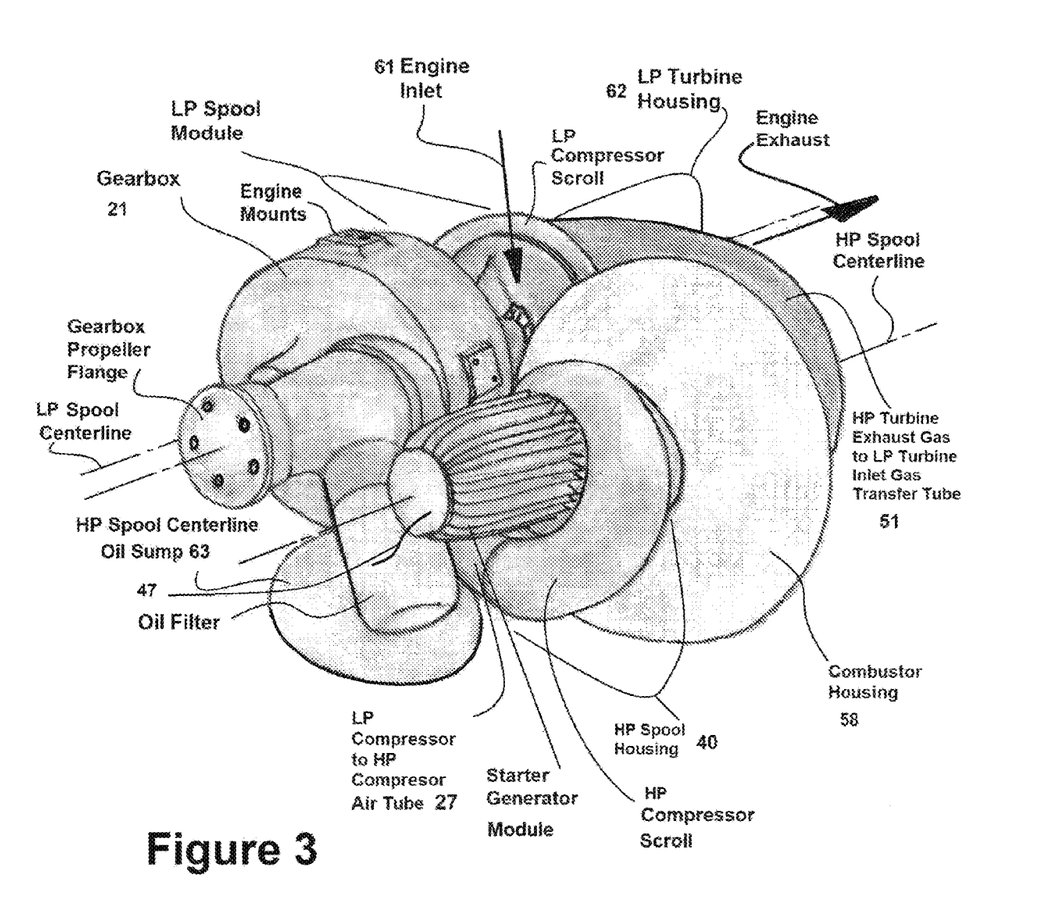
Figure 4:
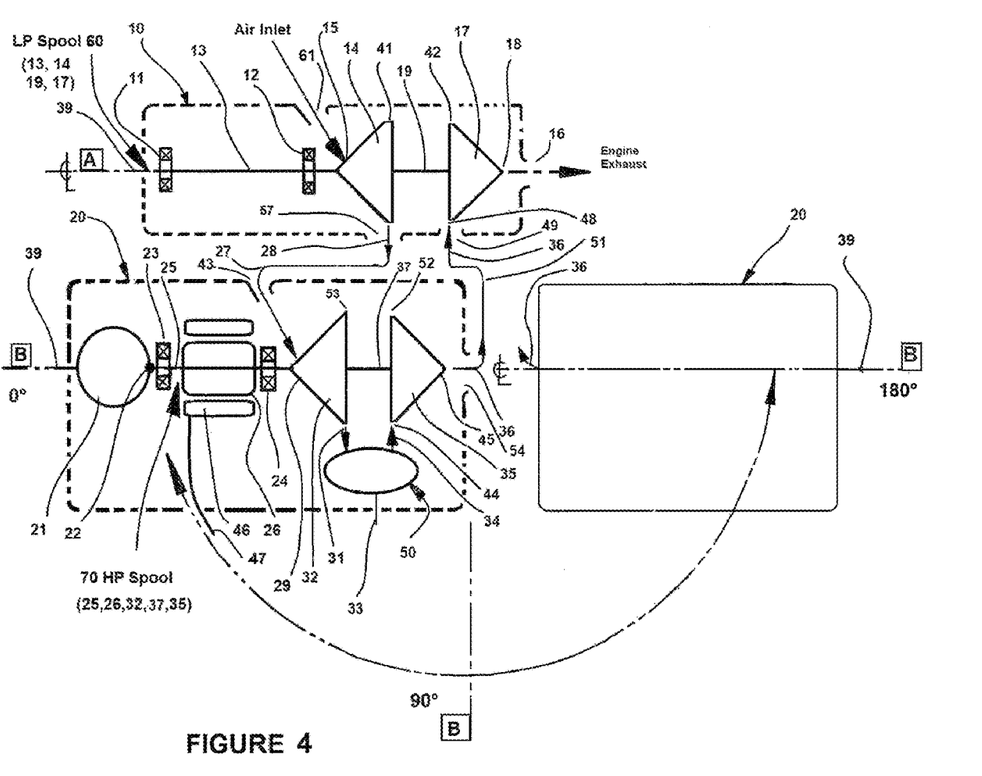
FIG. 4, a schematic, Advanced 2-Spool Turboprop engine, HP Spool-output power-integral alternator, capable 0° to 180° relative position, LP Spool Turbo.

In reference to FIG. 1 The LP Spool Housing 30 retains the LP Spool 60, the LP compressor diffuser at exit 41 LP compressor exit, the LP turbine nozzle 48 about the LP turbine rotor gas inlet 42, a LP Turbine Housing interconnected to the inlet port 49 and engine exhaust port 16 and a gearbox 21 with drive shaft (coupling) 22 along with an integral oil sump 63 FIG. 3 shared with the HP Spool Housing oil flow requirements. An engine air inlet 61 allows atmospheric air entry to the LP Compressor Rotor 14, inlet 15, LP Compressor Rotor with scroll air exiting from rotor 14 rotor exit of LP Compressor rotor 14 enters a diffuser about 41 LP compressor rotor air exit then thru exiting into and thru a scroll form with discharge from the LP Spool Housing 30 via LP Compressor Scroll air discharge port 57, to HP Spool Housing 40 port 43 entrance with interconnection to HP compressor rotor 32 with inlet 29. FIG. 3 depicts the preferred embodiment having the non-concentric spools LP Spool and HP Spool in close proximity for engine compactness. Referencing FIG. 1, a PM alternator 26 and stator 46 stator could be incorporated into the LP Housing 30, LP Spool 60 shaft 13 between bearings 11 and 12 as another an additional electrical output power means or for further electrical output power for distributed energy electrical power generation market removes the gearbox. The preferred embodiment FIG. 1 has a scroll form to collect the LP compressor discharge air and interconnected to an air transfer tube 27, as an alternate the LP Spool Housing could be integrated into the HP Spool Housing removing the modular housings LP and HP concepts and air/gas transfer tube needs. FIG. 4 depicts the LP spool driving a compressor from HP turbine waste heat wherein the HP spool drives a gearbox and is the gas generator but in this configuration more SHP alternator starter power is needed for the starting of the engine the propeller output power shaft speed at best for off design lowest speed is only at ~50% requiring a variable pitch propeller for operation. This housings HP and LP can be arranged in any position for optimized application (radial compressors and turbines).

As an additional configuration the LP and HP spool could be coaxial integrating an axial turbine, the LP Spool allow direct compressor intake with aircraft common direction wherein the compressor preferably a radial compressor can be ducted to the HP compressor for staged compression increasing engine OPR. Smaller diameter engine and longer overall. The LP Housing relative position to the HP Housing can be 0° to 180° as noted in FIG. 2, the gearbox for output shaft power could be integrated to the HP spool and positioned relative to the LP Spool 0° to 180° as noted in FIG. 4. Also, FIG. 4 engine configurations can have up to 2% more engine output power efficiency than the configuration FIG. 1 but requires higher electric power to drive the integral alternator starter generator during start mode. The gearbox of the LP spool drive could incorporate a conventional starter generator along with gear driven accessories.

The HP Spool 70 of FIG. 1 has a HP radial compressor rotor 32, a HP radial turbine rotor 35, a HP compressor shaft 25 with bearings, proximal shaft bearing 23 located at proximal HP compressor shaft end with the distal bearing 24 located about HP compressor shaft distal end interconnected to HP compressor rotor 32 inlet end 29 and integral alternator rotor 26 about and in close proximity to an alternator stator 46. The HP Spool 70 has integrated HP radial compressor rotor 32, a HP radial turbine rotor 35, a HP compressor shaft 25 with bearings, wherein 23 proximal bearing at the proximal HP compressor shaft proximal end and distal bearing 24, about the distal HP compressor shaft 25 end and alternator rotor 26 distal end, a shaft seal between bearing 24 and HP Compressor rotor 32 inlet 29, a PM alternator rotor 26 and are retained in the HP Spool Housing 40.

Although not shown a seal plate is retained between the HP compressor 32 and HP radial turbine 35 rotors with close proximity to the common rotor shaft 37 and retained between the HP compressor diffuser (about the compressor rotor exit) and HP turbine nozzle (about the turbine rotor entrance 52). The integral rotors of the spools could be separate details with central tiebolt bolted together, the overhung bearing arrangement could be configured as a straddle mounted bearings to shaft arrangement at each end of the spool or at either end of the compressor rotor having the turbine rotor overhung. Air bearings could be employed. The alternator rotor could be replaced by incorporation of an additional gearbox with conventional starter generator along with conventional accessories such as oil pump, fuel pump and mechanical fuel control engine speed control.

The LP Turbine Housing 62 has preferably a gas inlet scroll form receives HP turbine exhaust gas at port 49, has a LP turbine nozzle exhaust gas port 16, retains the turbine nozzle with integral HP turbine blade shroud and is attached to the LP Spool Housing. A scroll form with entrance port 49 receives the waste heat energy exiting gas 36 from HP turbine rotor 35, turbine exit 45, exit port 54 of turbine nozzle 48, via tube 51 interconnection delivery to entrance port 49 of LP turbine housing 62 to supply LP turbine nozzle 48 heat energy (waste heat from HP turbine 35 exit rotor 34 gas) to drive LP turbine rotor 17 having bladed rotor entrance 42. Ideal entrance flow of gas to nozzle is such to induce circumferential flow to the nozzle in the direction of rotor 17 rotation. The LP turbine rotor 17 has a rotor gas exit 18 gas flow communication with exit port 16 engine exhaust gas. The form could be non-scroll type simple annular chamber accepting direct HP gas flow 36 from supply tube 51 toward the rotor centerline entering a plenum like chamber with subsequent delivery to the turbine nozzle 48 and LP turbine rotor inlet 42.

The HP Spool Housing 40 retains: the HP Spool 70, a HP compressor inlet scroll with compressor blade tip shroud, a HP compressor diffuser, a combustor, a HP turbine nozzle with blade tip shroud and HP turbine nozzle with exhaust port and an alternator stator 46 with power leads 47 located about the HP alternator stator 46. The FIG. 1 is the preferred engine embodiment wherein the HP Spool Housing 40 retains the HP Spool 70, has a HP compressor inlet-scroll communication with inlet port 43, LP Compressor scroll discharge air port 57 interconnect with LP to HP air transfer tube 27, supply compressed air to HP compressor rotor inlet 29, communication with a HP compressor inlet scroll, a HP compressor/diffuser 31 with communication with a HP compressor scroll rotor shroud, a combustor 50 having HP spool compressor discharge air communication, retains the HP compressor to turbine seal plate, a HP turbine nozzle 48 with turbine rotor blade tip shroud and HP turbine nozzle exhaust port 54 communication with the combustor cover and combustor cover in communication with the HP Turbine exhaust gas to LP housing transfer tube 36.

As a means of oil supply and pre-oil system for extended bearing life considerations bearing life of the spool bearings and LP housing gearbox bearings an external electric oil pump is incorporated in the oil supply system along with electric fuel pump typical in the microturbine industry having related oil bearing system requirements. Within the housing retained also is the alternator stator co-axial to and close proximity of the alternator rotor wherein the housing removes the heat generated in the stator during engine operation. The preferred method is heat conduction thru outer housing external cooling fins. Internal oil cools alternator rotor. The HP Spool Housing could be of the configuration noted in FIG. 4 wherein a gearbox is incorporated into the HP Housing removing the need from the LP Spool integral gearbox and also the HP housing to LP Housing relationship can be positioned 0° to 180°. In FIG. 4 the LP Spool is the turbocharger stage not necessary for a gear box. Considering FIG. 1 having a gearbox reduction means to drive the propeller and if a conventional starter generator along with accessories mechanical driven type are necessary a second engine gearbox could be incorporated to the HP housing with a HP spool drive means.

The Combustor 50 receives HP compressor discharge air 31. The combustor of FIG. 1 is an annular type and ideally per U.S. Pat. No. 8,701,416 with a combustor cover that allows access to the HP Housing internal combustor and is retained to the HP Spool Housing 40 creating a pressure chamber about the combustor having internal HP compressor discharge air flow supply to the combustor for combustion fuel-air requirements. The inner form of the cover has communication with the HP turbine nozzle 48, turbine exhaust gas duct 54 having sealing means and has communication with the HP to LP turbine gas transfer tube 51. The HP Housing retains the ignitor, fuel injectors and other combustor interrelated related items. Another combustor configurations such as a can type could be incorporated with necessary engine housing design. The preferred fuel injectors are for an annular type associated patented combustor U.S. Pat. No. 8,701,416 with premix fuel air mixing tube U.S. Pat. No. 10,422,534 but could be other as in the Williams Turbine Co. or GE H-80 (Walter M 601 series) shaft fuel slinger and associated annular combustor design. The bearing arrangement to a straddle mounted system is then required removing simplicity in the 2-spool engine architecture and potential of bowed rotor hot restart.

The combustor cover retains and seals the combustor to the HP Spool Housing has communication with the HP compressor supply air, HP turbine nozzle seal means, HP turbine nozzle exhaust gas and HP to LP gas transfer tube. The combustor cover attaches to the HP Spool Housing retains the compressor air supply pressure about the inboard located combustor. The associated ignitor, fuel injectors and fuel supply system are part of the HP Spool Housing having combustor communication. The inner area of the combustor cover has communication with the HP turbine nozzle and HP to LP Gas transfer tube. The latter allows for the HP to LP housing relationship orientation of 0° to 180° as noted in FIG. 2. The design of the cover offers low cost thru simplicity with multifunction capability. The combustor cover could be of other forms and accept all external hardware associated with the combustor fuel delivery system ignitor, P and D valve instead of the HP Housing and etc.

but removes simplicity and adds cost. The HP to LP gas transfer tube 51 could be part of combustor cover assembly without need of seals.

The LP Compressor to HP Compressor Air Tube (LP to HP Air Tube) 27 is the transfer means of LP compressor discharge air to the HP compressor inlet. The LP to HP Air Tube 27 is the means to transfers LP compressor stage discharge air 28 at housing/scroll discharge port 29 to the HP Compressor scroll inlet housing port 43 with air-controlled velocity and insulation to preserve the air energy. Both ends communicate have seals associated scroll housing interface. The tube architecture allows manufacture of the LP and HP housing as modules for manufacturing reduced cost consideration and tube configurations such to allow 0° to 180° positioning engine application optimizations FIG. 2. The housings LP and HP could be configured as such to be integral and with or without separate air and gas transfer tubes. Reference FIG. 1 thru 7.

The HP to LP Gas Tube is the transfer means of HP turbine exhaust gas to the LP turbine housing inlet port. The HP to LP Gas Tube 51 is a hot gas transfer means to supply HP turbine exhaust gas 36 waste heat exiting turbine nozzle exhaust gas port 54 to the LP turbine housing inlet port 49 having seals. Minimal <0.5 psig and <2° F. drop in energy is anticipated. The tube forms allow 0° to 180° relative HP to LP housing positioning for engine application optimization (compactness). The tube ends have sealing means and are insulated with tube/duct form to minimize energy losses. Reference FIG. 1 thru 7. The tube forms can be of any configuration such as to accommodate the HP to LP housing relative positioning. The LP and HP housings could be designed such to not require this separate tube form. Reference FIG. 1 thru 7.

Figure 2:
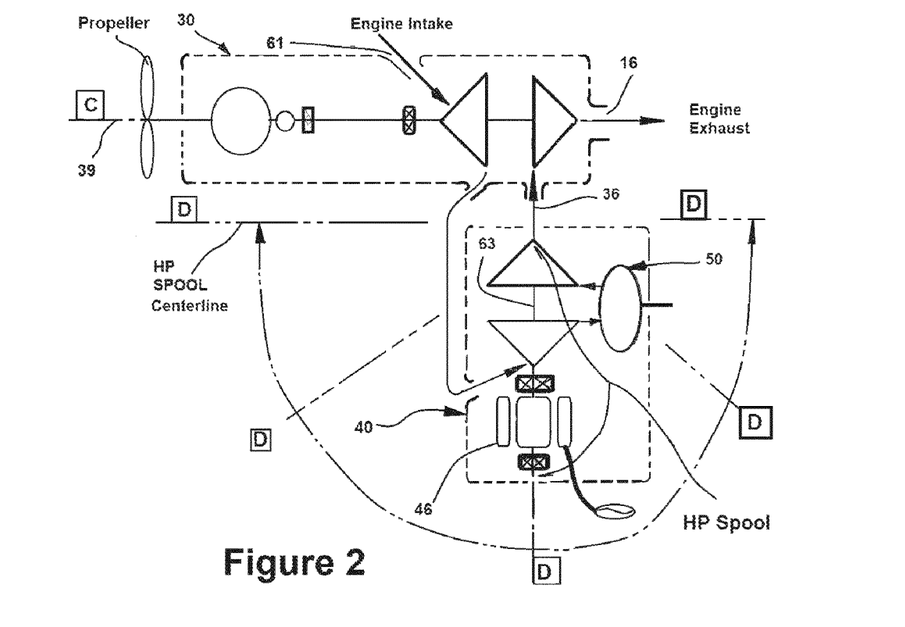
FIG. 2, schematic Advanced 2-spool Turboprop engine, LP Spool-output power, HP spool-gas generator capable 0° to 180° relative positions.

The preferred embodiment FIG. 1 of the described advanced 2-spool turboprop engine body integrates the HP Spool Housing 40 and the LP Spool Housing 30 into one unit with the HP Spool and LP Spool parallel and offset; inclusive of, one gearbox, two fluid transfer tubes (single or multiple each gas and air applications) wherein one is the LP compressor discharge air to HP compressor air inlet transition tube and the second is the HP turbine exhaust gas to LP turbine inlet housing transition tube. The LP Spool Housing 30 retains the LP diffuser, compressor air exit scroll having exit port 57, LP turbine nozzle 48 within the LP Turbine Housing 62 having interconnection with the output power gear box 21 thru LP Spool drive means a floating quill drive 22. The HP Housing 40 retains: the HP Spool 70 having an alternator rotor 26 proximal end in communication proximal end bearing 23 and HP compressor shaft 25 proximal end, the alternator distal end communicates with distal end HP compressor shaft bearing 24 and HP compressor rotor 32 inlet 29 end, the HP compressor rotor aft end and HP turbine rotor 35 have a common shaft 37, a laminate stator 46 having output electrical leads 47, HP compressor air inlet scroll housing with integral compressor rotor blade tip shroud with HP compressor rotor air exit 53 in communication with HP compressor diffuser 31 air exit and a combustor 50. Combustor receives external fuel supply 33 compressor/diffuser exit air flow 31 and resultant combusted hot gas 34 is discharged into the HP turbine nozzle 44 and then into the HP turbine rotor inlet 52 to drive 35 HP turbine rotor with HP turbine rotor gas 45 exit thru turbine nozzle exhaust gas port 54 having communication with HP turbine to LP turbine gas tube (HP to LP Air Tube) 51. The HP Housing to LP Spool Housing relative position shown in FIG. 2 show the LP spool centerline C to HP spool centerline D capable of 0° to 180° pending application. The preferred is 0° parallel for compactness. The 2-spool engine described in this application having staged compressors between the spools are aero-thermal-pressure coupled and can be applied not only to turboprop and turbo shaft engines but also to auxiliary power units (APU) associated with aircraft markets wherein the gear box of FIG. 1 could drive an external generator (starter generator means). Further, additional means of non-synchronous electric power generation an alternator rotor could be incorporated between the LP Spool Shaft bearings 11 and 12 on shaft 13 or integral with shaft for APU or distributed electric power generation.

Figure 5:
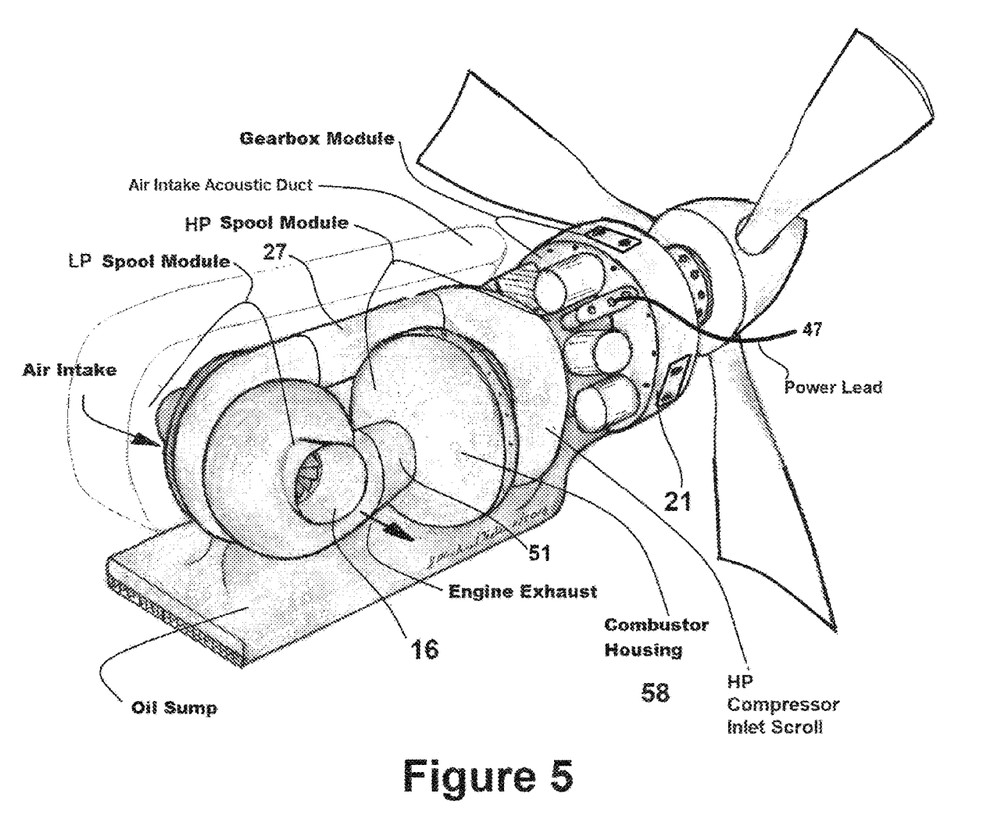
FIG. 5, 3D Art Rendering of FIG. 4, HP Spool-output power and LP Spool turbo with 90° orientation.

The floating quill drive could be replaced by simple LP Spool end drive gear or a gear between the two spool bearings 11 and 12. FIG. 1, 3 show parallel spool arrangement and can be in a horizontal or vertical plane position. The engine shown has a combustor heat source, but an external heat source could be implemented thru a heat exchanger means. FIG. 4 exhibits the integration of the gearbox 21 into the HP Spool Housing interconnected with the HP spool thru a drive means 22. The relative positions of the HP to LP Spools can be positioned parallel (0°) to 180° positions pending application. FIG. 5 is an example of a 90° relative position wherein the LP Spool is a turbocharger.

Analysis shows up to 2% engine output power efficiency gain using scheme FIGS. 4 and 5 but requires up to ~3x the electrical power for starting. Also, as a turboprop or turboshaft application output shaft speed (idle) reduction is limited to ~55% design spool speed whereas the FIG. 1 scheme the output shaft speed could be as low as 20% spool design speed. Spool bearing arrangements shown are overhung type but could be of a straddle mount type. FIG. 6 shows the LP and HP Spools coaxial wherein the HP exhaust gas waste heat from the output power spool drives the LP Spool via an axial turbine. All FIG. 1 thru 7 have integral alternator rotor/stator (starter—generator) system but could be replaced by a conventional starter generator but would require an additional gearbox adding cost.

The preferred embodiment of this 2-Spool (HP and LP Spools) invention Advanced 2-Spool turboprop engine is captured in FIGS. 1 and 3 inclusive of the Low Pressure (LP) Spool having a LP compressor rotor and LP turbine rotor using HP spool turbine exhaust gas waste heat drives a gearbox for output shaft mechanical rotational power driving a propeller for resultant thrust aircraft requirements. Internal to the gearbox is an integral oil pump and optional mechanical driven fuel pump. The gearbox of the preferred embodiment incorporates one stage epicyclic arrangement with an additional offset gear reduction to drive the propeller base on a 50 SHP engine design. For engine designs above ~150 SHP output power there is no need of an added side drive gear for the output shaft turboprop engine thus less cost to mfr. An oil sump system is incorporated common to both the HP Spool Housing and LP Spool Housing. The fuel delivery system is thru an electromechanical valve electronic fuel control, FADEC (full authority digital engine control) system. Other vehicular applications could include a turboshaft, electric or hybrid electric (air land and sea) also, synchronous electrical power generation or microturbine markets. The use of an Advanced 2-Spool turboprop not only removes the need of an exhaust gas recuperator application but offers higher efficiency competitive to a diesel engine at maximum power and higher efficiency at off design engine power requirements. Calculated output power efficiency engine power size ranges from FIG. 7 efficiency gains at higher horsepower output engines reference FIG. 7. Making use of the HP Spool as the output power spool ~2% further engine efficiency gain but not as versatile, more SHP to start and ~50% HP Spool idle speed. Reference AFRQ-WP-TR2019-0058 report FA965018P2141 contract. The selected simple 2-spool engine system having close coupled compressor and turbine rotors, welded construction with overhung type bearing arrangements offers low cost and high life capability with one lifetime balance and lower cost to manufacture the engine lending further toward the general aviation market. The 2-spool concept arrangements are unique to this engine and based on successful previous engine design, engineering, engine test and manufacture of the TMA 70 (70 kW) hybrid electrical power plant reference U.S. Pat. No. 7,574,867 having high pressure ratio capable radial turbine and compressor rotors with staged compressors and turbines aero-thermal-pressure coupled. Also having previous experiences in the design, engineering, manufacturing assembly and test of the world's first microturbine with initial test in 1994 of a single spool engine successful design, engineer, test, manufacturing, and marketing experience. Reference U.S. Pat. Nos. 6,314,717, 6,845,621. This advanced 2-spool turboprop engine has been in the making over the last 50 years, low cost, high reliability, high efficiency general aviation turbine engine (GATE). The 2-spool engine is for both retro and current general aviation markets thru competitive engine cost, low overhaul cost, 7000 hrs. estimated TBO, lower SFC than current piston (gasoline and diesel types) along with all the other inherent advantages of the new turboprop engine. Considering the engine high efficiency capability, and integral PM alternator system, removes the need of the accessory gearbox along with a prime mover engine use the HP Spool integrated PM alternator can be used also as an APU in aircraft applications (ground/flight). FIG. 1 preferred embodiment the HP spool can operate successfully without vibration issues down to 50% design speed and the LP spool can operate as low as 20% design speed. The variable speed capability spools of this engine lend to other vehicular markets. at design or off design spool speeds and reduced spool speed up to ~50% of design capability. Furthermore, having a 2-spool system allows the engine to be used at reduced power and or spool speed for further improved fuel economy especially in extended ground operation and meeting emissions regulation requirements. Incorporating the proven engine tested combustor (U.S. Pat. No. 8,701,416) lends to low emissions meeting EPA exhaust gas emissions TIER 4, 5 regulations without exhaust gas treatments and no flame out tendencies at any engine operation airflow or engine spool speeds. Having the gas generator (HP Spool operation) with an integrated PM generator-starter separate from the gearbox allows ease of starting (hot or cold conditions) with low SHP requirements. The pioneers, inventors, engineers of the microturbine (single spool engine with alternator) engine business started in 1994 along with the hybrid gas turbine engine (two spools one alternator) in 2002 are J. Michael Teets and Jon William Teets. Based on the author's experience with the successful 2 spool engine design TMA70 (70 kW) U.S. Pat. No. 7,574,867, TMA Power, LLC, and previous Elliott Energy Systems Microturbine design, engineer, manufacture, test, marketing experience (U.S. Pat. No. 6,845,621) the HP spool could be cold started and powered to max conditions in less than 10 seconds using the integral alternator starter generator. Also, as another means of engine starting air start (black start) explosive charge (like current cruise missile turbine engines) or portable power direct drive to the HP Spool could be implemented. Without a gearbox for starting and accessories (typical in current turboprop engines) hp losses it is calculated less than 25% of the electric power is required to start compared to the engine of gearbox FIG. 4 scheme. Scheme FIG. 3 design study Air Force Contract FA865918P2141, report AFRL-RQ-WP-TR-2019-0058, 50 SHP Advanced 2 Spool turboprop engine preliminary output power capability, on a ~32° F. day requires alternator electric power of <3 SHP to start the engine: at ~10,000 rpm HP spool speed combustion is initiated and with electric spooling power the HP spool is driven to self-sustaining idle operation (100,000 rpm-55% HP spool design speed 190,000 rpm). Considering integral HP Spool PM alternator as exhibited in FIGS. 4 and 5 the engine cold starting @32° F.~8 SHP electric power is necessary due to gearbox and spool bearing. SHP losses. Using a FADEC electronic fuel control system to start the engine the HP Spool is electrically (DC volts, 24 to 100) driven PM power alternator stator system to a defined start speed combustion initiation at ~10% HP Spool design speed then with chemical heat product of combustion energy and electric alternator power the HP Spool is driven to sustaining speed of ~55% design spool speed (15 to 30 sec estimated): at this time the electrical power start is switched to electrical output power wherein the high frequency output PM electrical AC volts with high frequency engine power is power electronic PE converted to rectified DC electric useful output electric power and can be further changed to AC with controlled output useful frequency. This engine design requires no cool shut down time period or time delay for restart and acceleration rate is limited to design turbine inlet temperature without any bowed rotor tendencies. The design intent for this Advanced 2-Spool turboprop is simplicity, high efficiency, low fuel use, low-cost affordability initial purchase for the general aviation markets, UAV and UAS markets. Along with low-cost other goals are met that include high durability, low maintenance, low emissions, low weight, multifuel, variable speeds operation optimized fuel use and low SFC without emissions compromise.

OPERATION (Reference FIG. 1 as the preferred embodiment) The LP Spool 60 is insertable into LP Housing 30 and consists of a LP compressor rotor 14 (ideally radial with less PR than HP Compressor Rotor), a LP Turbine Rotor 17 and a LP compressor shaft 13 having a proximal end communication with the power output drive/coupling 22 gearbox 21, distal end communicates with the LP compressor inlet end, with bearings proximal 11, distal 12 the latter in close proximity to the LP compressor inlet end (also not seen are shaft seals and bearing supports for view simplicity). A floating quill drive shaft 22 insertable into the LP Compressor Spool shaft 13 with coupling 22 length has an outboard drive gear end with communication planet gears of epicyclic gear reduction arrangement and an additional side loaded gear to drive the propeller of the gearbox 21.

Other gearbox types and arrangement of gears could be used in place. The spool bearings have squeeze film dampers incorporated. A shaft seal is incorporate between the aft bearing 12 and LP compressor rotor 14 inlet 15. A LP compressor rotor air exit 41 has communication with an adjacent LP compressor diffuser 28 interconnecting exiting air into LP Compressor to HP Compressor Air Tube (LP to HP Air Tube) 27. The turbine rotor 17 has and radial tip gas entrance 42 having communication with LP turbine nozzle 48. Between the LP turbine nozzle and LP diffuser is retained a seal plate with close proximity to the integral common shaft 19 between rotors 14 and 17. A engine air inlet 61 is part of the LP Scroll integral to the LP scroll housing 30 that ducts air to the LP compressor rotor 14 inlet. The LP Spool has separate BLISK (integrally bladed rotor) radial \ compressor rotor, turbine rotor and shaft as a welded construction but could have details bolted together and or monorotor cast as one-unit compressor and turbine. The LP Spool Housing 30 within the LP Housing are retained: compressor diffuser 28 having air entrance in communication with compressor rotor air exit 41 and scroll form having exit port 57, a LP compressor scroll having communication with the LP compressor rotor inlet and blade tip shroud form in close proximity of LP Compressor rotor 14 integral blades, a gearbox 21 having internal reduction gears, oil pump, output power shaft 39, quill drive gear 22, a LP Spool assembly having bearing retention means thru squeeze film dampers and seal plate between compressor rotor 14 and turbine rotor 17, a compressor engine inlet duct 61 communication with engine compressor rotor inlet 15, a LP Turbine Housing 62 attached adjacent to the LP Compressor scroll having internal LP Turbine nozzle 48 integral turbine blade tip shroud and LP turbine exhaust port. Relative position of the LP Spool Housing to HP Spool Housing shows a parallel spool housing package for compactness but could as in FIG. 2 could be 0° to 180° pending application. The LP Turbine Housing 62 is preferably a scroll form with a HP exhaust gas inlet port 49, receives HP turbine exhaust gas 36 via port 49 from supply tube 51, induces a preswirl to the incoming hot gas with turbine rotor 17 rotation direction retains and has communication with the LP nozzle 48 with resultant hot gas driven LP turbine rotor 17 communication with the LP turbine rotor inlet 42 and turbine rotor exit 18 into exhaust duct 16. The hot gas could also enter the LP turbine housing in a non-tangential direction but have some induced pressure losses. Pending application, the nozzle may not be necessary leaving the scroll form geometry to induce the tangential velocity for LP turbine drive requirements. Also like in some turbo chargers the vaned nozzle could be removed and rely on scroll geometry induced LP turbine inlet velocity or variable vane-nozzle but the latter adds expense.

The HP Spool 70 having a HP radial compressor rotor 32, a HP radial turbine rotor 35, a alternator rotor 26, a HP compressor rotor shaft 25 with bearings, HP compressor shaft proximal bearing 23 located about the alternator rotor 26 proximal end, HP comp. rotor shaft proximal end, a HP compressor shaft distal bearing 24 adjacent to the alternator rotor 26 distal end, HP compressor shaft distal end, HP compressor rotor inlet end 29 and preferably as a module is insertable into HP Spool Housing 40 wherein said HP compressor rotor shaft bearings are retained to HP Spool housing 40 preferably thru integral squeeze film dampers. A seal plate is located between the HP compressor and HP turbine rotors and retained between the HP compressor diffuser 31 and HP turbine nozzle with close radial proximity to the integral common rotor shaft 37 as sealing means-controlled HP compressor discharge air flow to the HP turbine rotor. Preferably an inertia welded construction for good rotor dynamic control one-time balance.

As alternatives the HP spool shaft bearings could be straddle shaft mounted without dampers and multipiece tiebolt or curvic coupling assembly.

The FIG. 1 preferred embodiment, HP Spool housing 40 retains: the HP Spool 70, the alternator stator 46 with electrical output power leads 47 co-axial to and in close proximity to the alternator rotor 26, an HP compressor inlet air supply scroll about the HP compressor inlet with air preswirl capability with HP compressor 32 direction of rotation, having inlet port 43 with HP compressor rotor inlet 29 air communication, an integral shroud of the HP compressor scroll with close proximity to the HP compressor rotor 32 blade tips, a HP compressor rotor shaft 25 seal between the aft distal bearing 24 and HP compressor rotor inlet 29, a HP compressor diffuser 31 with HP compressor rotor air exit 53 communication diffuser entrance and exit air combustor communication, a combustor internal heat energy source with external fuel supply 33 created combusted fuel/air mixture drives the HP Turbine rotor 35 thru HP turbine nozzle 44 directed heat energy combustor hot gas to turbine rotor 35 entry 52 wherein HP turbine rotor 35 exit 45 exhaust gas 36 communicates with HP Turbine Nozzle Exhaust Gas Duct 54 and HP to LP Gas Transfer Tube 51.

The Combustor 50 is retained within the HP Spool Housing having communication with fuel injectors, ignitor, retentions bolts interconnected to the housing, has HP Spool compressor diffuser discharge air 31 and external fuel communication, within the combustor fuel and air has controlled premixing of a combustible mixture with subsequent ignitor ignition for a continuous flame. The combusted gas heat energy discharges into the HP turbine nozzle 44 with downstream turbine rotor 35 entrance 52 causing interconnected HP Spool rotation. The combusted hot gas with some of the heat energy SHP dissipated exits the HP Turbine Rotor Gas Exit 45, exhaust gas 36, discharging thru HP Turbine Nozzle Exhaust Gas duct 54 then into the HP Turbine to LP turbine Gas Tube (HP to LP Gas tube) 51. Although the preferred combustor ref U.S. Pat. No. 8,701,416 other combustors like the can type could be implemented. The Combustor Cover is retained to the HP Spool Housing aft end, preferably annular form, is about the preferred annular combustor U.S. Pat. No. 8,701,416 with premix chamber U.S. Pat. No. 10,422,534 seals the combustor to the HP Spool Housing has communication with the HP Spool HP compressor rotor discharge air 31, interconnects with the HP turbine nozzle 44 exhaust discharge end, exhaust gas 36, HP Turbine Nozzle Exhaust Gas Duct 54 and interfaces with HP Turbine to LP Turbine Gas Tube 51 entrance.

As an alternate form the combustor cover could interface with the combustor as a location means incorporating the fuel injectors, combustor retention pins and ignitor but then added costs. Also, an alternate scheme the tube form 51 could be integrated to the combustor cover. LP to HP Air Tube 27, is a means to transfer LP Compressor rotor discharge air 28 to HP Compressor Rotor inlet 15 wherein tube 27 proximal end has communication with the LP compressor-diffuser discharge air 28, LP Compressor Scroll (FIG. 7) air discharge port 57 and the discharge end in communication with HP Compressor scroll inlet port 43. The air transfer tube allows the engine spool and housing configuration unique to application and ease engine mfr. Ideal air transfer to the HP compressor rotor inlet 29 involves a scroll inlet form to induce a inlet air flow preswirl of air in the direction of HP compressor rotation to help reduce SHP needed to drive the compressor lending to overall engine efficiency gain and or simply minimize inlet flow losses. Also, could have air flow straight in toward the compressor axis of rotation but can experience efficiency losses in compressor and engine. Tube forms can be multiple, the delivery tube round or square could be part of the LP compressor scroll and or HP compressor inlet scroll. HP Turbine to LP Turbine Gas Tube (HP to LP Gas Tube) 51 is the means to transfer HP turbine 35 exhaust gas 36 to the LP Turbine 19, drive means for the LP Spool, wherein the proximal tube end has communication with the HP Turbine Nozzle Exhaust Gas Duct 54 and the distal end communication with the LP Turbine Housing 62 with seal means. This separate transfer tube allows the LP and HP housings relative position 0° to 180° optimizing engine configuration capability per engine application and ease of engine mfr. The transfer tube HP to LP gas tube 51 square or round form could be integral to the combustor cover or HP turbine nozzle or LP Turbine Housing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of this invention.

What is claimed is:

1. A gas turbine engine comprising: an engine body comprising a Low Pressure (LP) Spool Housing and a High Pressure (HP) Spool Housing; a Low Pressure (LP) Spool with an axis of rotation within said LP Spool Housing, said LP Spool has a LP centrifugal compressor rotor with an air intake and compressed air exit; the LP spool being connected to only two LP Spool bearings, a first of the only two LP Spool bearings being adjacent to the LP centrifugal compressor rotor; the LP centrifugal compressor rotor and LP radial turbine rotor connected by a common shaft with no bearing; a high pressure (HP) Spool with an axis of rotation within said HP Spool Housing, said HP Spool has a HP centrifugal compressor rotor with a compressed air inlet and compressed air exit, a HP radial turbine rotor having a gas inlet and gas exit, a HP compressor rotor shaft, an integral permanent magnet (PM) alternator rotor with retained magnets is interconnected to said HP compressor rotor shaft; the HP Spool being connected to only two HP Spool bearings, a first of the only two HP Spool bearings on a first side of the PM alternator rotor, and a second of the only two HP spool bearings on a second opposite side of the PM alternator rotor and adjacent to the HP centrifugal compressor rotor; the HP centrifugal compressor rotor and HP radial turbine rotor connected by a common shaft with no bearing.

2. The gas turbine engine of claim 1 wherein the LP spool housing further comprising a gearbox, wherein a second of the only two LP Spool bearings is adjacent to the gearbox.

3. The gas turbine engine of claim 2 further comprising: a LP compressor rotor shaft, an LP radial turbine rotor with a gas inlet and gas exit, said LP compressor rotor shaft interconnects and drives the gearbox having an output power shaft within said LP Spool Housing.

4. The gas turbine engine of claim 1 wherein the HP spool housing further comprising a gearbox, wherein the first of the only two HP Spool bearings is adjacent to the gearbox.

5. The gas turbine engine of claim 1 wherein said HP Spool axis of rotation is parallel to and offset from the LP Spool axis of rotation.

6. The gas turbine engine of claim 1 further comprising an alternator stator within said HP Spool Housing is co-axial to said PM alternator rotor, said alternator stator has magnetically attracted laminate stack with electrical wires wound about and through said laminate stack exiting said HP Spool Housing.

7. The gas turbine engine of claim 6 wherein said exiting electrical wires are input power mode and output power mode capable.

8. The gas turbine engine of claim 7 wherein said input power electric energy cause said PM alternator rotor rotation to function as electric motor, said output power electrical generating mode said PM alternator rotor rotation through said interconnected HP turbine rotor to function as generator.

9. The gas turbine engine of claim 1 further comprising a combustor within said HP Spool Housing having communication with said HP centrifugal compressor rotor compressed exit air and external supplied fuel, said combustor supplies product combusted hot gases to said HP radial turbine rotor gas inlet.

10. The gas turbine engine of claim 1 wherein an air intake within said LP Spool Housing communicates with said LP centrifugal compressor rotor air intake.

11. The gas turbine engine of claim 1 wherein a Compressor air scroll has air communication with said LP Spool Housing air intake, said LP centrifugal compressor rotor air intake and LP centrifugal compressor rotor air exit flow.

12. The gas turbine engine of claim 1 wherein a LP Spool Housing turbine exhaust gas exit duct has communication with said LP radial turbine rotor gas exit.

13. The gas turbine engine of claim 1 further comprising a LP to HP Air Tube which has air communication with said LP centrifugal compressor rotor air exit air flow and said HP centrifugal compressor rotor air inlet.

14. The gas turbine engine of claim 13 further comprising a HP compressor inlet scroll having an air inlet and air exit, the air inlet communicates with said LP to HP Air Tube, said HP compressor rotor inlet, said HP compressor inlet scroll the air exit flow induces HP compressor inlet airflow pre-swirl in direction of said HP compressor rotor rotation.

15. The gas turbine engine of claim 1 further comprising a HP to LP Gas Tube which supplies said HP radial turbine rotor gas exit energy to said LP radial turbine rotor gas inlet.

16. The gas turbine engine of claim 1 wherein said HP Spool axis of rotation is parallel to the LP Spool axis of rotation.

17. The gas turbine engine of claim 1 wherein said HP Spool axis of rotation is not parallel to the LP Spool axis of rotation.

18. The gas turbine engine of claim 1 wherein said HP Spool axis of rotation is oriented at a 90-degree angle relative to the LP Spool axis of rotation.

19. The gas turbine engine of claim 1 wherein said HP Spool axis of rotation is offset from the LP Spool axis of rotation.

* * * * *